(12) United States Patent
Lee (10) Patent No.: US 10,897,885 B2
(45) Date of Patent: Jan. 26, 2021

(54) BRAKE MECHANISM AND FISHING REEL HAVING THE SAME

(71) Applicant: HAIBAO FISHING TACKLE CO., LTD., Cixi (CN)

(72) Inventor: Wen-Hsiang Lee, Taichung (TW)

(73) Assignee: HAIBAO FISHING TACKLE CO., LTD., Zhejiang (CN)

( * ) Notice: Subject to any disclaimer, the term of this patent is extended or adjusted under 35 U.S.C. 154(b) by 0 days.

(21) Appl. No.: 16/565,096

(22) Filed: Sep. 9, 2019

(65) Prior Publication Data

US 2020/0093110 A1 Mar. 26, 2020

(30) Foreign Application Priority Data

Sep. 20, 2018 (CN) .......................... 2018 1 1099260

(51) Int. Cl.
*A01K 89/02* (2006.01)
*A01K 89/015* (2006.01)

(52) U.S. Cl.
CPC .......... *A01K 89/02* (2013.01); *A01K 89/0187* (2015.05)

(58) Field of Classification Search
CPC .......... A01K 89/0182; A01K 89/01931; A01K 89/03; A01K 89/056; A01K 89/059; F16D 1/09; F16D 1/0882; F16D 1/092; F16D 1/093
See application file for complete search history.

(56) References Cited

U.S. PATENT DOCUMENTS

| | | | | |
|---|---|---|---|---|
| 1,145,038 | A * | 7/1915 | Schramm ........... | A01K 89/0193 242/265 |
| 5,407,144 | A * | 4/1995 | Ryall .................... | A01K 89/056 242/295 |
| 6,336,605 | B1 * | 1/2002 | Littau .............. | A01K 89/01557 242/289 |
| 6,908,054 | B1 * | 6/2005 | Kim .................... | A01K 89/0155 188/18 A |
| 9,670,968 | B1 * | 6/2017 | Holley, Jr. .............. | F16D 1/092 |
| 9,999,210 | B1 * | 6/2018 | Kim ...................... | A01K 89/056 |
| 2006/0260886 | A1 * | 11/2006 | Erlston .................... | F16D 55/50 188/71.5 |

* cited by examiner

*Primary Examiner* — Emmanuel M Marcelo
(74) *Attorney, Agent, or Firm* — Lewis Roca Rothgerber Christie LLP (57) ABSTRACT

A brake mechanism is provided for braking rotation of a rotary member in a spinning reel or a baitcasting reel. The brake mechanism includes a frame unit, an actuating member, a biasing member, a plurality of actuated members, and a plurality of brake pieces. The actuating member is biased by the biasing member to an outer position. In response to movement of the actuating member to an Inner position from the outer position, the actuated members are moved radially and outwardly to permit the brake pieces to be brought into frictional engagement with the rotary member to thereby brake the rotation of the rotary member.

11 Claims, 8 Drawing Sheets

BRAKE MECHANISM AND FISHING REEL HAVING THE SAME

CROSS-REFERENCE TO RELATED APPLICATION

This application claims priority from Chinese invention patent application No. 201811099260.3, filed on Sep. 20, 2018.

FIELD

The disclosure relates to a brake mechanism, more particularly to a brake mechanism and a fishing reel having the same. The fishing reel may be a spinning reel or a baitcasting reel.

BACKGROUND

Taiwanese patent publication No. 449459, corresponding to U.S. counterpart U.S. Pat. No. 6,460,792 B1, discloses a conventional spinning reel having a drag mechanism (or a braking mechanism). Taiwanese patent publication No. I650072, corresponding to U.S. counterpart U.S. Pat. No. 9,832,984 B2, discloses a conventional baitcasting reel with a drag mechanism. The drag mechanism may include a plurality of metal brake plates and a plurality of non-metal brake plates which are disposed to alternate the metal brake plates. When the metal and non-metal brake plates are brought into friction engagement with each other, an assembly of those brake plates is in frictional contact with a rotary member in the conventional spinning or baitcasting reel in an axial direction, to thereby brake rotation of the rotary member.

SUMMARY

A first object of the disclosure is to provide a novel brake mechanism with a better braking performance. A second object of the disclosure is to provide a spinning reel including the brake mechanism. A third object of the disclosure is to provide a baitcasting reel including the brake mechanism.

According to a first aspect of the disclosure, a brake mechanism for braking rotation of a rotary member includes a frame unit, an actuating member, a biasing member, a plurality of actuated members, and a plurality of brake pieces. The frame unit defines a central passage which extends along a central axis, and a plurality of radial passages which are angularly displaced from each other about the central axis, and which extend inwardly and radially to communicate with the central passage. The actuating member is disposed in the central passage, and is configured to be actuated to move from an outer position along the central axis to an inner position. The biasing member is disposed in the central passage to bias the actuating member to the outer position. The actuated members are disposed respectively in the radial passages. Each of the actuated members has a pressing end segment and an actuated end segment which is radially opposite to the pressing end segment, and which is configured to be actuated by the actuating member such that in response to movement of the actuating member to the inner position, the actuated members are moved radially and outwardly. Each of the brake pieces is disposed on the pressing end segment of a respective one of the actuated members such that when the actuating member is moved to the inner position, the brake pieces are able to be forced into frictional engagement with the rotary member to thereby brake the rotation of the rotary member.

According to a second aspect of the disclosure, a spinning reel includes the brake mechanism, a reel body, a drive unit disposed inside the reel body, a crank coupled to the drive unit, and mounted rotatably on an outer surface of the reel body, a rotor coupled to be driver, by the drive unit when the crank is driven to rotate, and a spool unit coupled to be driven by the drive unit to linearly reciprocate relative to the rotor in a direction of the central axis when the crank is driven to rotate. The spool unit includes a spool shaft, a spool member, and a partition wall. The spool shaft extends along the central axis. The spool member has an outer line-winding surface for a fishing line to be wound thereon, and an inner peripheral surface which is opposite to the outer line-winding surface to surround the spool shaft, and which has a front surface region and a rear surface region disposed rearwardly of the front surface region. The spool member is configured to be driven to rotate about the central axis in response to unwinding of the fishing line wound on the outer line-winding surface of the spool member. The partition wall is disposed between the front and rear surface regions, and extends radially and inwardly from the inner peripheral surface of the spool member to terminate at a center bore configured for passage of the spool shaft. The partition wall and the front surface region cooperatively define an accommodation space for receiving the brake mechanism such that when the actuating member is moved to the inner position, the brake pieces are brought into frictional engagement with the front surface region of the spool member to thereby brake the rotation of the spool member.

According to a third aspect of the disclosure, a baitcasting reel includes the brake mechanism, a reel body, a spool unit mounted rotatably to the reel body, and a drive unit. The drive unit includes a crank, a main shaft, and a drive gear member. The crank is mounted rotatably on an outer surface of the reel body. The main shaft extends along the central axis to terminate at an inner end segment which is disposed inside the reel body, and an outer end segment which is coupled to the crank so as to permit the main shaft to be driven by the crank to rotate about the central axis. The drive gear member is disposed inside the reel body, and includes a base wall which is coupled to the inner end segment of the main shaft to permit the drive gear member to rotate with the main shaft, and a surrounding wall which extends from a periphery of the base wall in a direction of the central axis toward the outer end segment of the main shaft. The surrounding wall has an inner wall surface and an outer wall surface formed with driving teeth which is configured to be coupled to the spool unit to permit co-rotation of the spool unit and the drive gear member. The base wall and the inner wall surface of the surrounding wall cooperatively define an accommodation space for receiving the brake mechanism such that when the actuating member is moved to the inner position, the brake pieces are brought into frictional engagement with the inner wall surface of the drive gear member to thereby brake the rotation of the drive gear member and to thereby brake rotation of the spool unit.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, etc.). These directional definitions are intended to merely assist in describing and claiming the disclosure and are not intended to limit the disclosure in any way.

Figure 1:
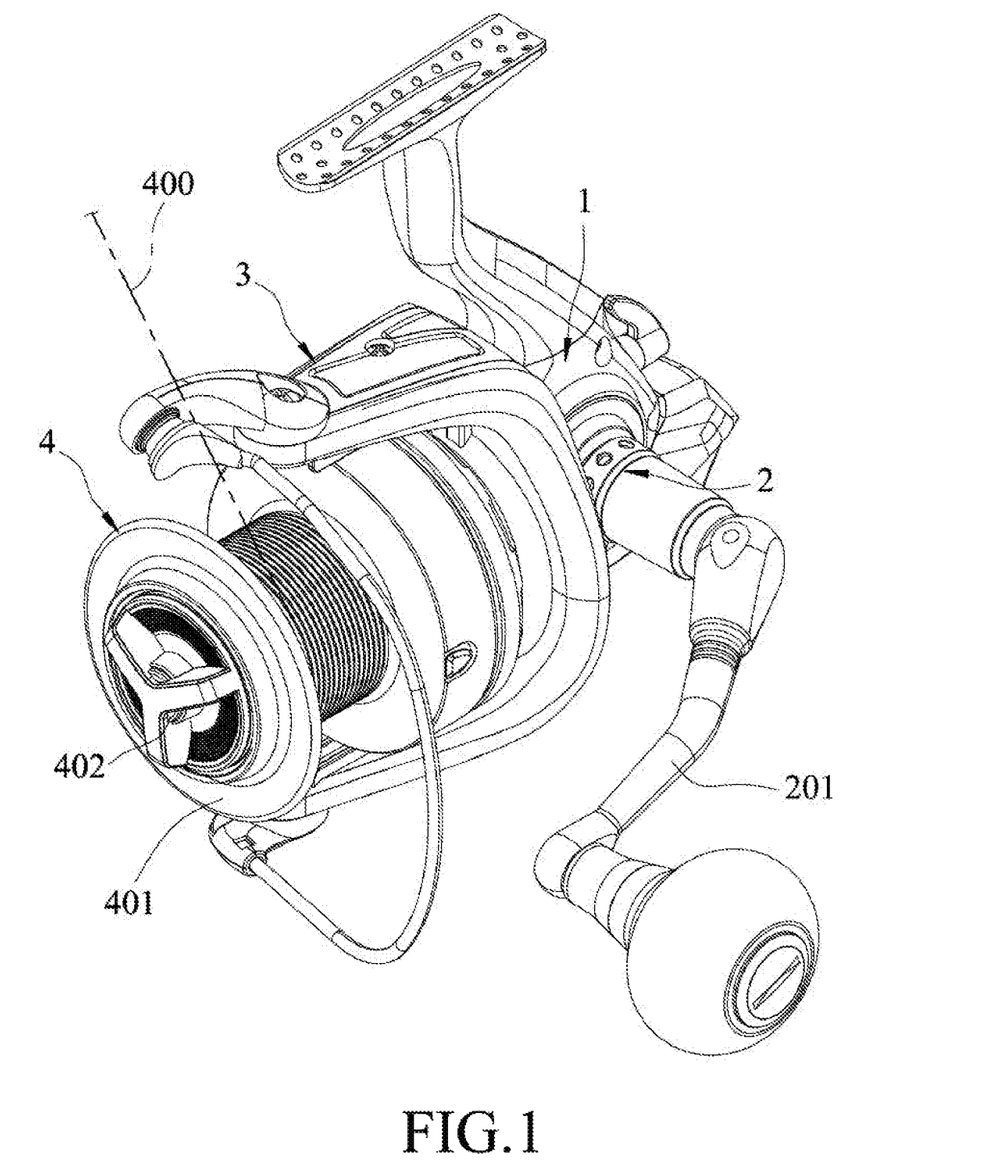
FIG. 1 is a perspective view of a spinning reel according to a first embodiment of the disclosure.
Figure 2:
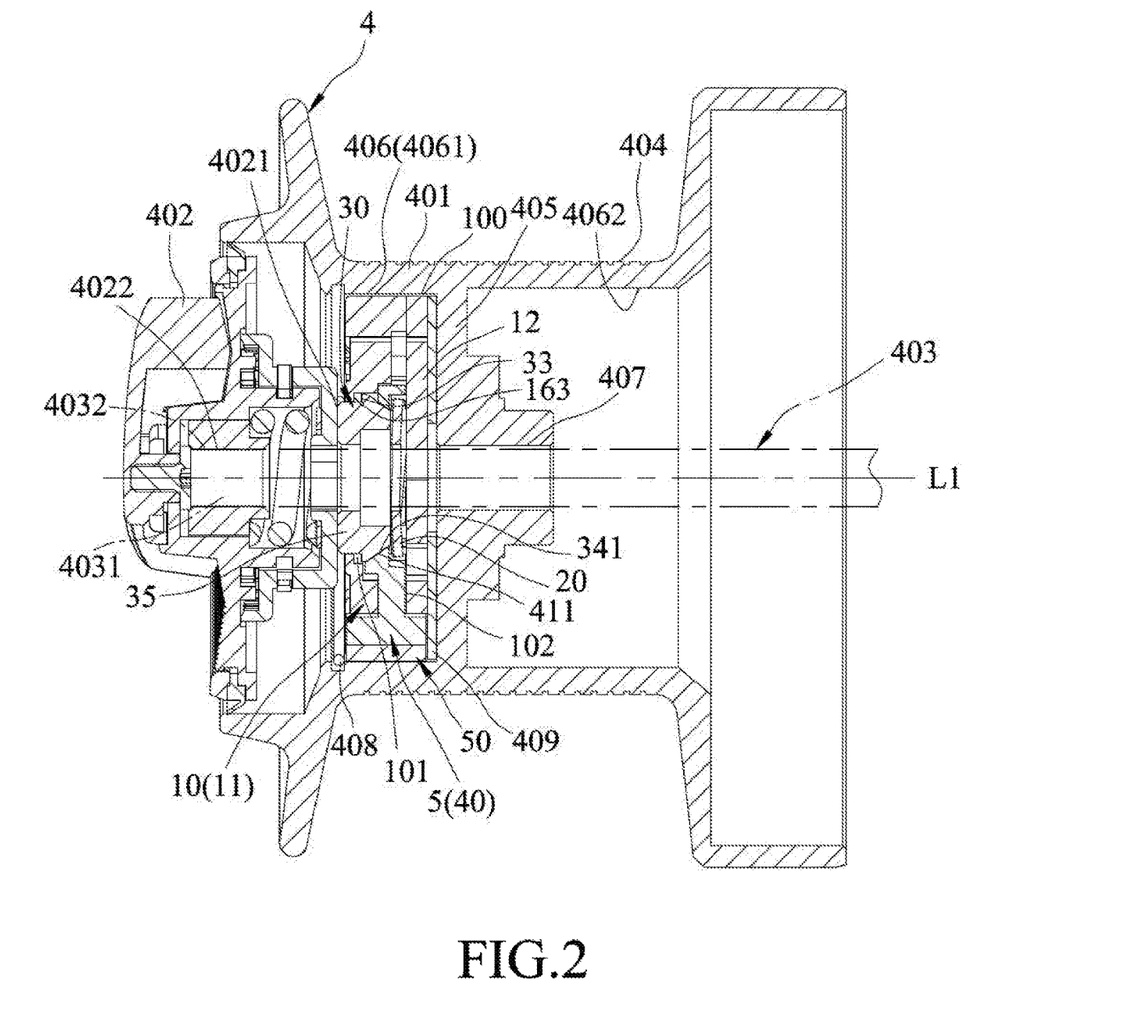
FIG. 2 is a cross-sectional view illustrating a spool unit and a brake mechanism of the spinning reel.
Figure 3:
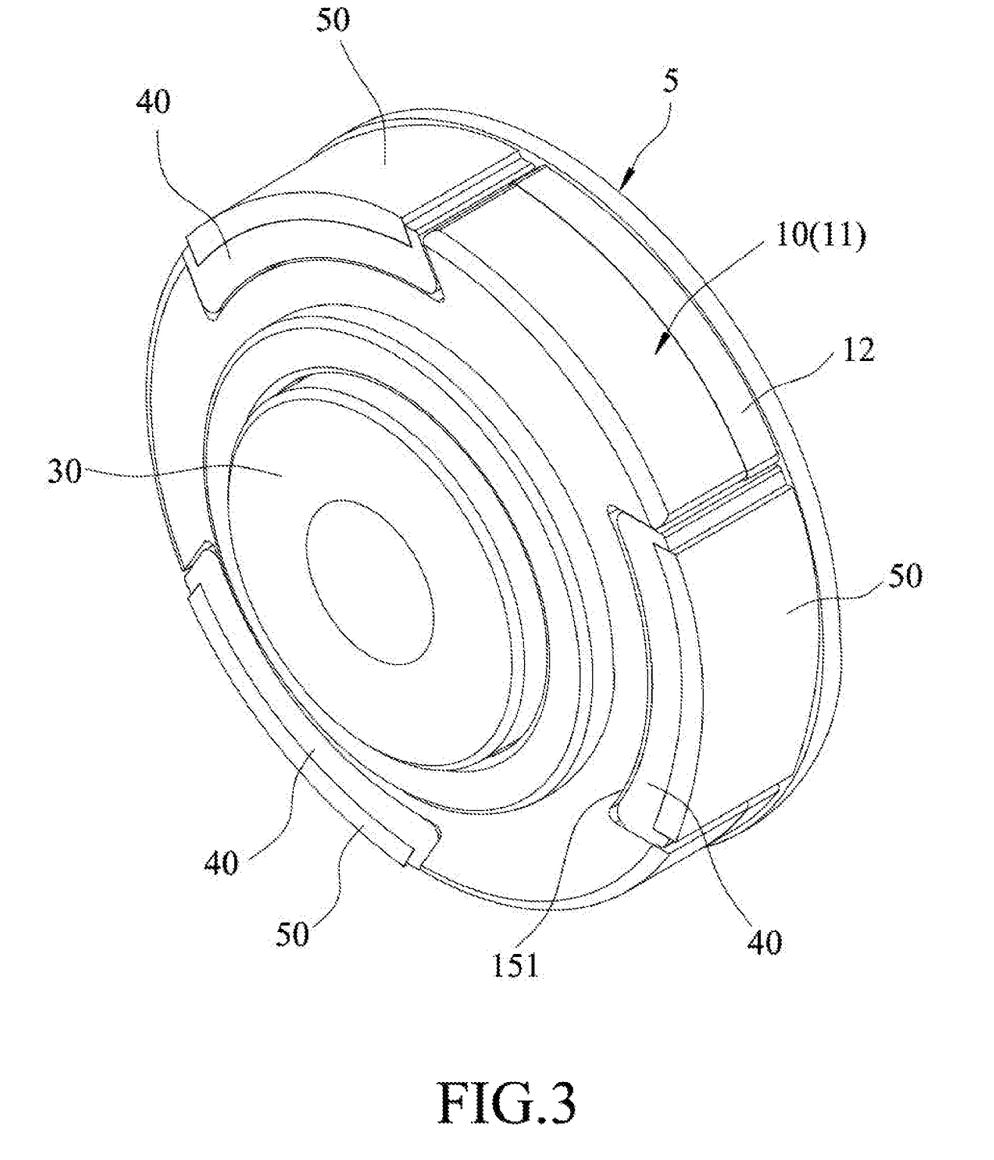
FIG. 3 is a perspective view of the brake mechanism.

Referring to FIGS. 1 to 3, a spinning reel according to a first embodiment of the disclosure is shown to include a reel body 1, a drive unit 2, a crank 201, a rotor 3, a spool unit 4, and a brake mechanism 5.

Figure 4:
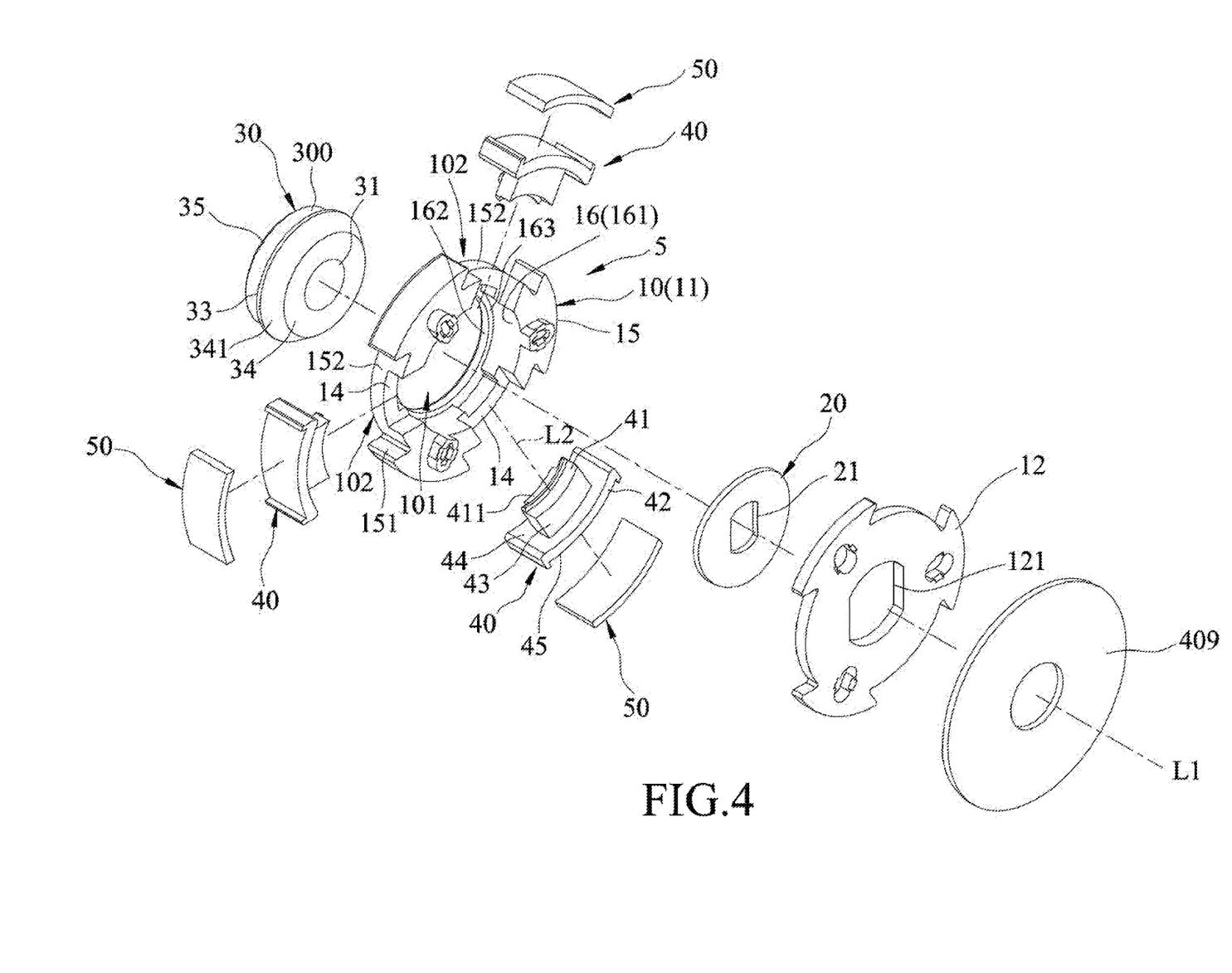
FIG. 4 is an exploded perspective view of the brake mechanism.

The brake mechanism 5 is provided for braking rotation of a rotary member. As shown in FIGS. 3 and 4, the brake mechanism 5 includes a frame unit 10, a biasing member 20, an actuating member 30, a plurality of actuated members 40, and a plurality of brake pieces 50. In this embodiment, the rotary member is a spool member 401 (descried below) of the spool unit 4.

As shown in FIG. 2, the frame unit 10 defines a central passage 101 which extends along a central axis (L1), and a plurality of radial passages 102 which are angularly displaced from each other about the central axis (L1), and which extend inwardly and radially to communicate with the central passage 101. Each of the radial passages 102 extend along a radial axis (L2) relative to the central axis (L1).

Figure 5:
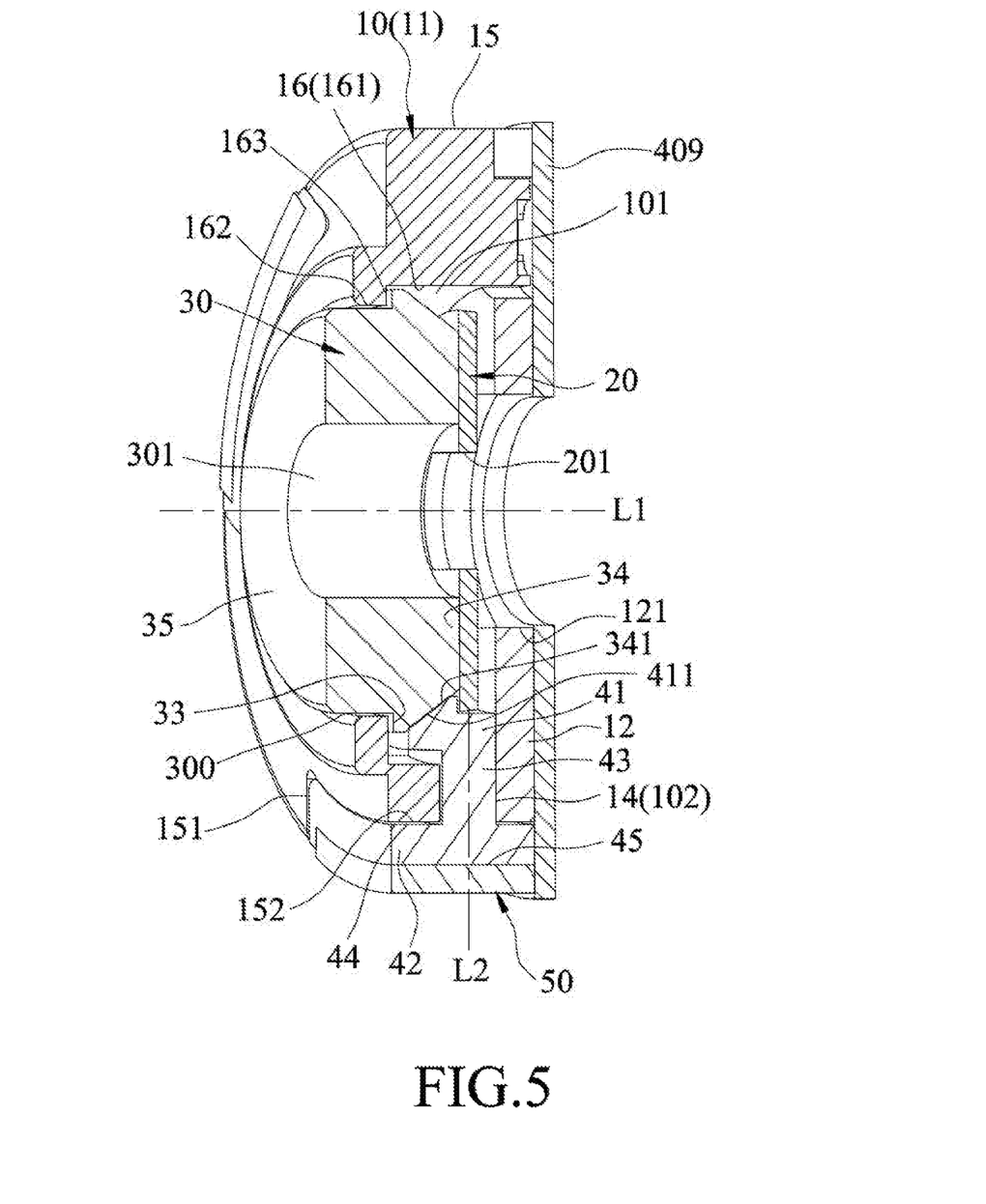
FIG. 5 is a cross-sectional view of the brake mechanism.

In an embodiment shown in FIGS. 4 and 5, the frame unit 10 includes a main frame 11 having an inner peripheral surface 16 which borders the central passage 101 and an outer peripheral surface 15 which is opposite to the inner peripheral surface 16 in radial directions. The inner peripheral surface 16 has a first dimension region 161 and a second dimension region 162 which has a smaller dimension than the first dimension region 161 so as to define a first shoulder region 163 with the first dimension region 161.

In an embodiment shown in FIGS. 4 and 5, the outer peripheral surface 15 is formed with a plurality of recesses 151 displaced angularly from each other about the central axis (L1). Each of the recesses 151 extends radially and inwardly to have a recess bottom 152. The inner peripheral surface 16 of the main frame 11 is formed with a plurality of radial holes 14 which are displaced from each other about the central axis (L1). Each of the radial holes 14 extends radially and outwardly through the recess bottom 152 of a respective one of the recesses 151 so as to define a respective one of the radial passages 102 with the respective one of the recesses 151.

In an embodiment shown in FIGS. 2 and 4, the frame unit 10 may further include a cover plate 12 which is coupled to the main frame 11 to define an inner end of the central passage 101. In an embodiment shown in FIG. 4, the cover plate 12 may have a central bore 121.

The actuating member 30 is disposed in the central passage 101, and is configured to be actuated to move from an outer position along the central axis (L1) to an inner position (FIG. 2).

In an embodiment shown in FIGS. 2 and 4, the actuating member 30 has an outer actuating end segment 35 and an inner abutting end segment 34 which is opposite to the outer actuating end segment 35, and which has a tapered abutting surface 341 tapered inwardly along the central axis (L1).

In an embodiment shown in FIGS. 4 and 5, the actuating member 30 has an outer surrounding surface 300 which surrounds the central axis (L1), and which defines a second shoulder region 33 disposed between the outer actuating end segment 35 and the inner abutting end segment 34. The second shoulder region 33 is configured to be brought into abutting engagement with the first shoulder region 163 when the actuating member 30 is in the outer position.

In an embodiment shown in FIGS. 4 and 5, the actuating member 30 may have a center bore 31.

The biasing member 20 is disposed in the central passage 101 to bias the actuating member 30 to the outer position. In an embodiment shown in FIGS. 4 and 5, the biasing member 20 may be a disc spring having a center bore 21.

In an embodiment shown in FIGS. 2 and 4, the biasing member 20 is disposed between the actuating member 30 and the cover plate 12 to bias the actuating member 30 to the outer position.

As shown in FIGS. 2, 4, and 5, the actuated members 40 are disposed respectively in the radial passages 102. Each of the actuated members 40 has a pressing end segment 42 and an actuated end segment 41 which is radially opposite to the pressing end segment 42, and which is configured to be actuated by the actuating member 30 such that in response to movement of the actuating member 30 to the inner position, the actuated members 40 are moved radially and outwardly. Each of the brake pieces 50 is disposed on the pressing end segment 42 of a respective one of the actuated members 40 such that when the actuating member 30 is moved to the inner position, the brake pieces 50 are able to be forced into frictional engagement with the rotary member (i.e., the spool member 401) to thereby brake the rotation of the rotary member (the spool member 401).

In an embodiment shown in FIGS. 2, 4, and 5, the actuated end segment 41 of each of the actuated members 40 is formed with an inclined region 411 which is configured to slidably contact the tapered abutting surface 341 so as to permit the actuated members 40 to be guided by the actuating member 30 to move radially and outwardly in response to the movement of the actuating member 30 to the inner position.

In an embodiment shown in FIGS. 2 and 4, the pressing end segment 42 of each of the actuated members 40 is in a form of retaining plate configured to retain a respective one of the brake pieces 50 in a respective one of the recesses 151. The retaining plate 42 has an inward surface 44 confronting the recess bottom 152 of the respective recess 151, and an outward surface 45 confronting the respective brake piece 50. Each of the actuated members 40 induces an intermediate segment 43 which is between the pressing end segment 42 and the actuated end segment 41, and which is slidably disposed in a respective one of the radial holes 14.

The drive unit 2 is mounted to the reel body 1. The crank 201 is coupled to the drive unit 2 and is mounted rotatably on an outer surface of the reel body 1. The rotor 3 is coupled to be driven by the drive unit 2 to rotate when the crank 201 is driven to rotate. The spool unit 4 is coupled to be driven by the drive unit 2 to linearly reciprocate relative to the rotor 3 in a direction of the central axis (L1) when the crank 201 is driven to rotate. The rotor 3 and the spool unit 4 may be driven by the drive unit 2 in a conventional manner, which may be similar to those disclosed in U.S. Pat. No. 6,460,792 B1. Therefore, the connections among the drive unit 2, the rotor 3, and the spool unit 4 are omitted for brevity. The spool unit 4 may include a spool shaft 403, a spool member 401, and a partition wall 405.

The spool shaft 403 extends along the central axis (L1). In an embodiment shown in FIG. 2, the spool shaft 403 may be disposed in the central passage 101 and may extend through the central bores 31, 21, 121 of the actuating member 30, the biasing member 20, and the cover plate 12. The spool shaft 403 has a front end segment 4031 which is disposed forwardly of the actuating member 30, and which has a male threaded region 4032.

The spool member 401 has an outer line-winding surface 404 for a fishing line 400 to be wound thereon, and an inner peripheral surface 406 which is opposite to the outer line-winding surface 404 to surround the spool shaft 403. The inner peripheral surface 406 has a front surface region 4061 and a rear surface region 4062 disposed rearwardly of the front surface region 4061. The spool member 401 is configured to be driven to rotate about the central axis (L1) in response to unwinding of the fishing line 400 wound on the outer line-winding surface 404 of the spool member 401.

The partition wall 405 is disposed between the front and rear surface regions 4061, 4062, and extends radially and inwardly from the inner peripheral surface 406 of the spool member 401 to terminate at a center bore 407 configured for passage of the spool shaft 403. The partition wall 405 and the front surface region 4061 cooperatively define an accommodation space 100 for receiving the brake mechanism 5 such that when the actuating member 30 is moved to the inner position, the brake pieces 50 are brought into frictional engagement with the front surface region 4061 of the spool member 401 to thereby brake the rotation of the spool member 401.

In an embodiment shown in FIGS. 2, 4, and 5, the spinning reel may further include a brake plate 409 disposed between the frame unit 10 and the partition wall 405 such that when the actuating member 30 is moved to the inner position, the brake plate 409 is brought into frictional engagement with the partition wall 405 to thereby further brake the rotation of the spool member 401.

In an embodiment shown in FIG. 2, the spinning reel may further include a positioning ring member 408 disposed in the accommodation space 100 in front of the frame unit 10 so as to position the frame unit 10 in the accommodation space 100.

In an embodiment shown in FIGS. 1 and 2, the spinning reel may further include an operating star member 402 having a rearward surface 4021 and a female threaded region 4022. The rearward surface 4021 is disposed to be in abutting engagement with the actuating member 30. The female threaded region 4022 is configured to be threadedly engaged with the male threaded region 4032 of the spool shaft 403 so as to permit the operating star member 402 to slide relative to the spool shaft 403 along the central axis (L1) to thereby allow the actuating member 30 to be pushed inwardly by the rearward surface 4021 of the operating star member 402 from the outer position to the inner position.

Figure 6:
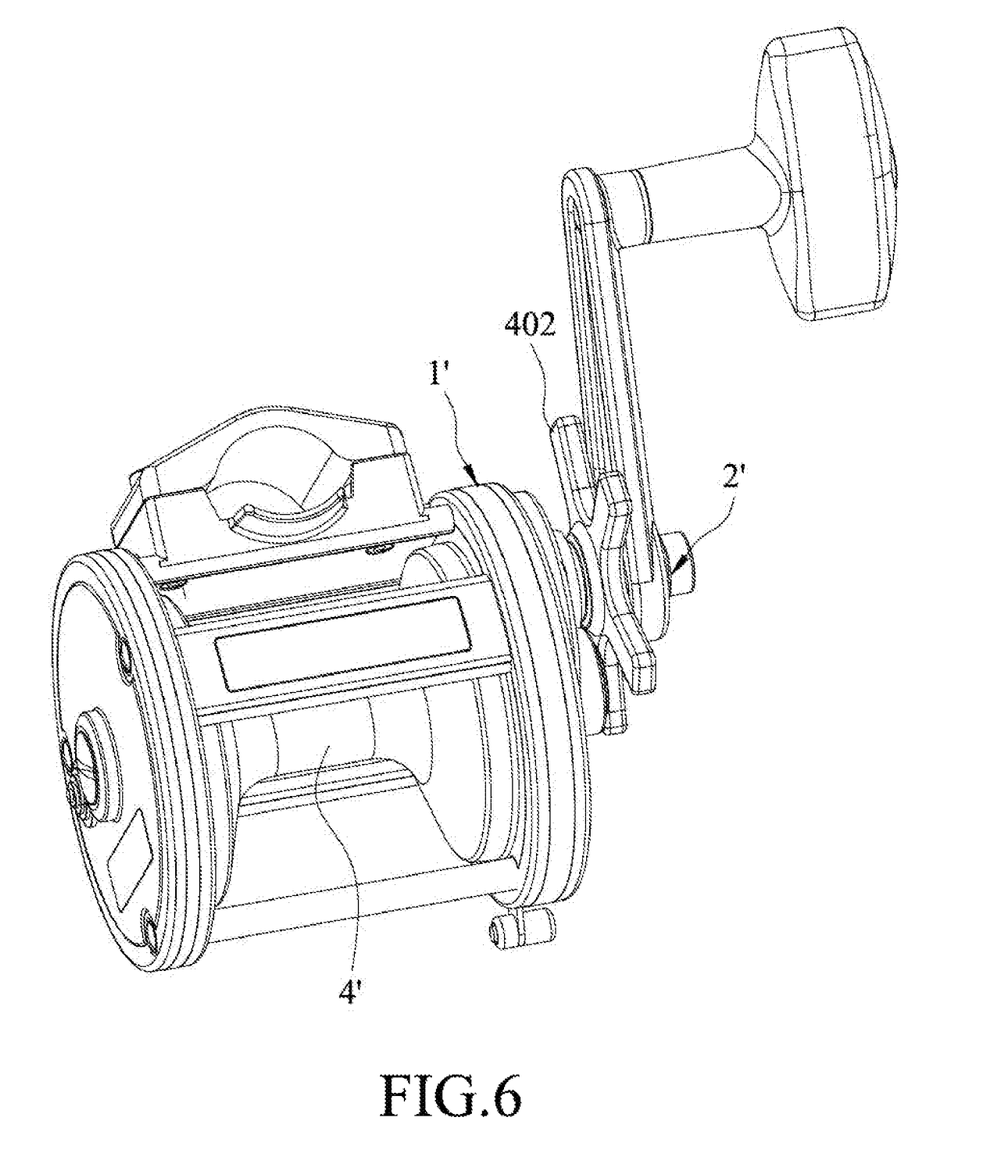
FIG. 6 is a perspective view of a baitcasting reel according to a second embodiment of the disclosure.
Figure 7:
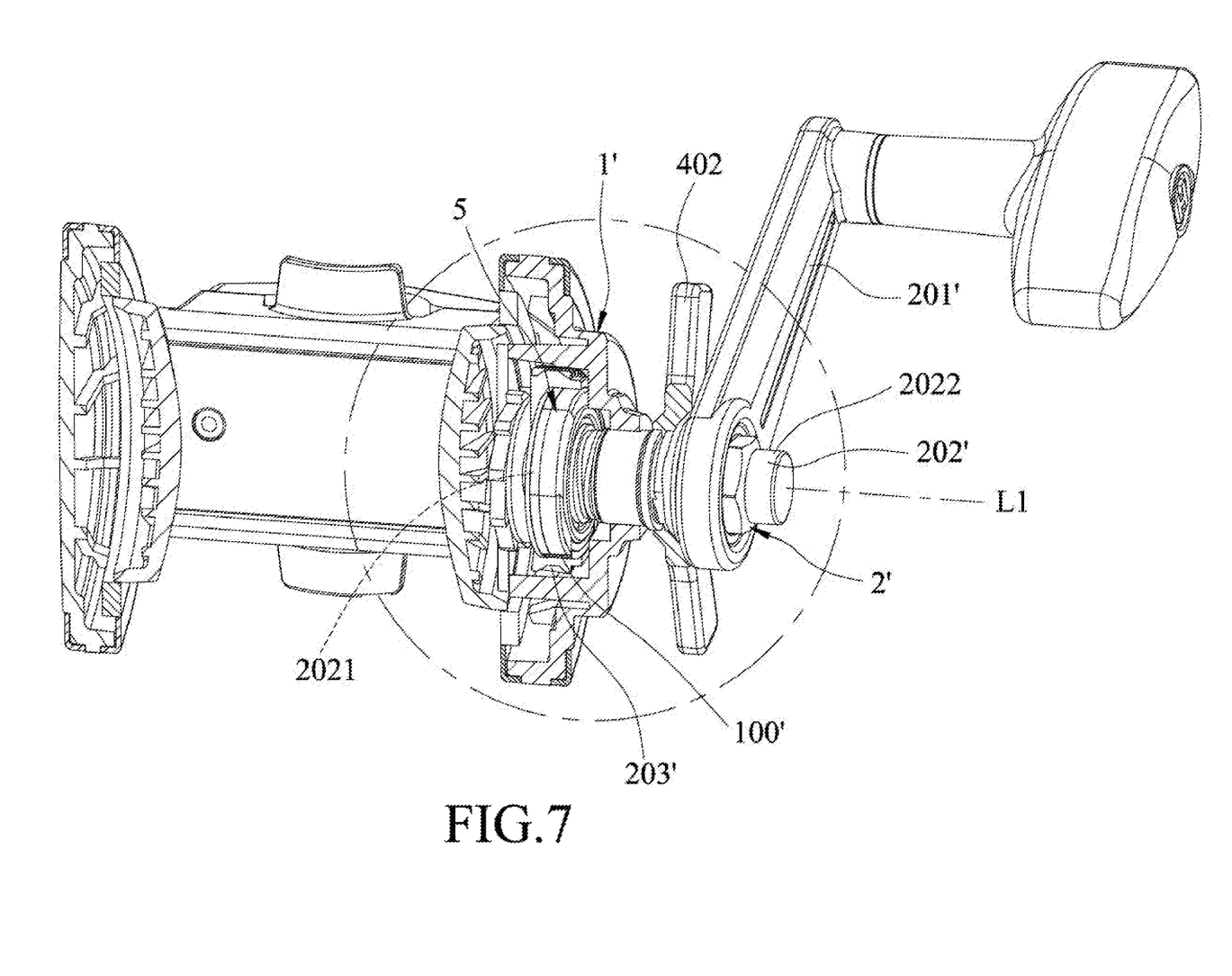
FIG. 7 is a partially cross-sectional view of the baitcasting reel.
Figure 8:
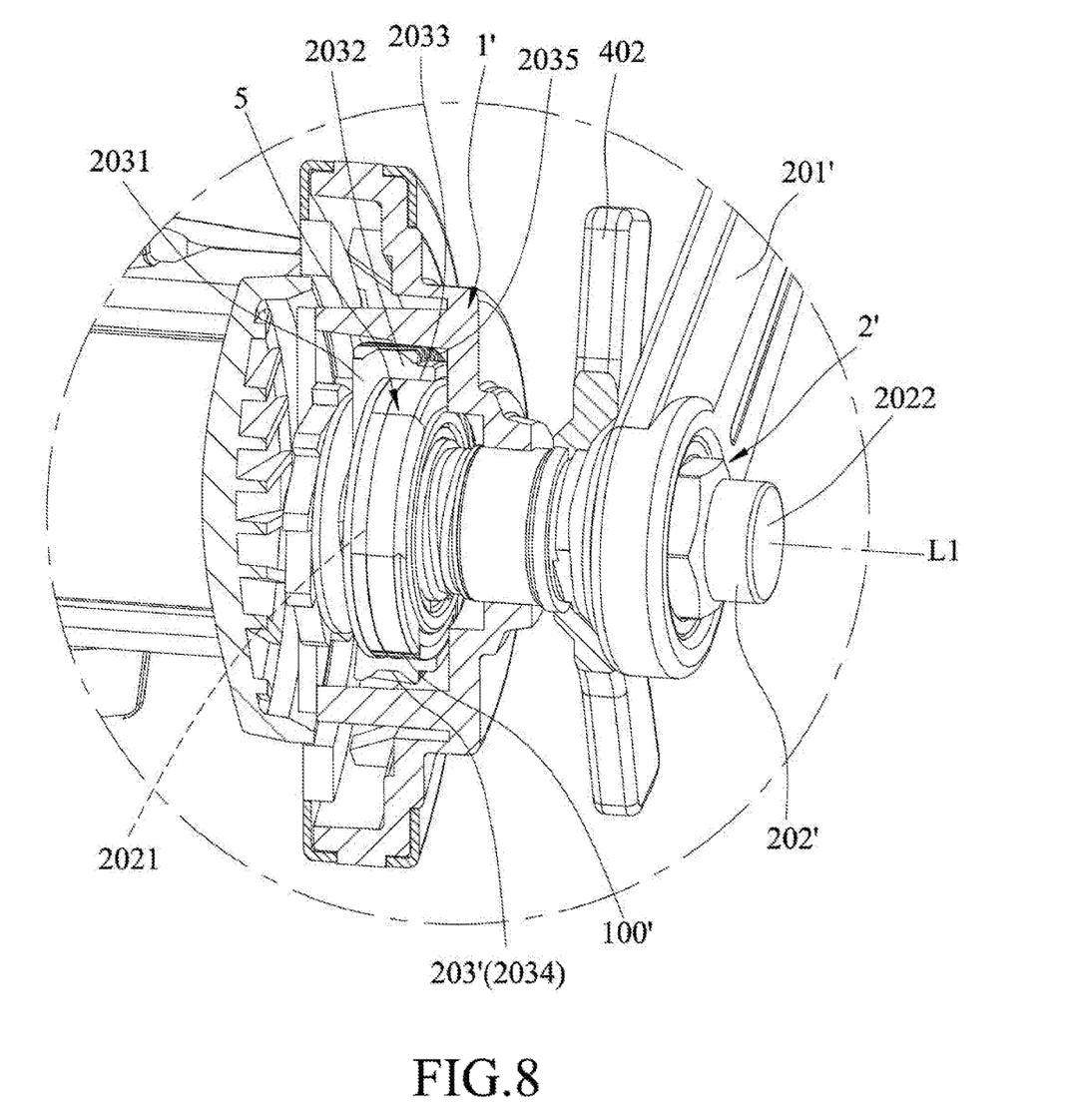
FIG. 8 is a fragmentary enlarged view of FIG. 7.

FIGS. 6 to 8 illustrate a baitcasting reel according to a second embodiment of the disclosure. The baitcasting reel includes a reel body 1', a drive unit 2', a spool unit 4', and a brake mechanism 5.

The brake mechanism 5 is substantially the same as that described in the first embodiment, but, in the second embodiment, is provided for braking rotation of a drive gear member 203' (described below) of the drive unit 2'.

The spool unit 4' is mounted rotatably to the reel body 1. The drive unit 2' includes a crank 201', a main shaft 202', and the drive gear member 203' (mentioned above). The crank 201' is mounted rotatably on an outer surface of the reel body 1'.

The main shaft 202' extends along the central axis (L1) to terminate at an inner end segment 2021 which is disposed inside the reel body 1', and an outer end segment 2022 which is coupled to the crank 201' so as to permit the main shaft 202' to be driven by the crank 201' to rotate about the central axis (L1).

The drive gear member 203' is disposed inside the reel body 1', and includes a base wall 2031 and a surrounding wall 2032. The base wall 2031 is coupled to the inner end segment 2021 of the main shaft 203' to permit the drive gear member 203' to rotate with the main shaft 202'. The surrounding wall 2032 extends from a periphery of the base wall 2031 in a direction of the central axis (L1) toward the outer end segment 2022 of the main shaft 202, and has an inner wall surface 2033 and an outer wall surface 2034 formed with driving teeth 2035 which is configured to be coupled to the spool unit 4' to permit co-rotation of the spool unit 4' and the drive gear member 203'. The base wall 2031 and the inner wall surface 2033 of the surrounding wall 2032 cooperatively define an accommodation space 100' for receiving the brake mechanism 5 such that when the actuating member 30 is moved to the inner position (shown in FIG. 2 only), the brake pieces 50 are brought into frictional engagement with the inner wall surface 2033 of the drive gear member 203' to thereby brake the rotation of the drive gear member 203' and the rotation of the spool unit 4'. The spool unit 4' may be driven by the drive gear member 203' in a manner similar to that disclosed in U.S. Pat. No. 9,832,934 B2, and the connections between the spool unit 4' and the drive gear member 203' are thus omitted for brevity.

In an embodiment shown in FIGS. 6 to 8, the baitcasting reel may further include an operating star member 402 similar to that of the first embodiment. In this embodiment, the operating star member 402 may be turned to slide on the main shaft 202' along the central axis (L1) so as to move the actuating member 30 between the outer and inner positions.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A brake mechanism for braking rotation of a rotary member, said brake mechanism comprising:
    a frame unit defining a central passage which extends along a central axis, and a plurality of radial passages which are angularly displaced from each other about the central axis, and which extend inwardly and radially to communicate with said central passage;
    an actuating member disposed in said central passage, and configured to be actuated to move from an outer position along the central axis to an inner position;
    a biasing member disposed in said central passage to bias said actuating member to the outer position;
    a plurality of actuated members disposed respectively in said radial passages, each of said actuated members having a pressing end segment and an actuated end segment which is radially opposite to said pressing end segment, and which is configured to be actuated by said actuating member such that in response to movement of said actuating member to the inner position, said actuated members are moved radially and outwardly; and
    a plurality of brake pieces each of which is disposed on said pressing end segment of a respective one of said actuated members such that when said actuating member is moved to the inner position, said brake pieces are able to be forced into frictional engagement with the rotary member to thereby brake the rotation of the rotary member.

2. The brake mechanism according to claim 1, wherein said actuating member has an outer actuating end segment and an inner abutting end segment which is opposite to said outer actuating end segment, and which has a tapered abutting surface tapered inwardly along the central axis; and
    said actuated end segment of each of said actuated members is formed with an inclined region which is configured to slidably contact said tapered abutting surface so as to permit said actuated members to be guided by said actuating member to move radially and outwardly in response to the movement of said actuating member to the inner position.

3. The brake mechanism according to claim 2, wherein said frame unit includes a main frame having an inner peripheral surface which borders said central passage, and which has a first dimension region and a second dimension region that has a smaller dimension than said first dimension region so as to define a first shoulder region with said first dimension region; and
    said actuating member has an outer surrounding surface which surrounds the central axis, and which defines a second shoulder region disposed between said outer actuating end segment and said inner abutting end segment, said second shoulder region being configured to be brought into abutting engagement with said first shoulder region when said actuating member is in the outer position.

4. The brake mechanism according to claim 3, wherein said main frame has an outer peripheral surface which is opposite to said inner peripheral surface in radial directions, and which is formed with a plurality of recesses displaced angularly from each other about the central axis, each of said recesses extending radially and inwardly to have a recess bottom;
    said inner peripheral surface of said main frame is formed with a plurality of radial holes which are displaced from each other about the central axis, each of said radial holes extending radially and outwardly through said recess bottom of a respective one of said recesses so as to define a respective one of said radial passages with the respective one of said recesses;
    said pressing end segment of each of said actuated members is in a form of retaining plate configured to retain a respective one of said brake pieces in a respective one of said recesses; and
    each of said actuated members includes an intermediate segment which is between said pressing end segment and said actuated end segment, and which is slidably disposed in a respective one of said radial holes.

5. The brake mechanism according to claim 3, wherein said frame unit further includes a cover plate which is coupled to said main frame to define an inner end of said central passage; and
    said biasing member is disposed between said actuating member and said cover plate to bias said actuating member to the outer position.

6. The brake mechanism according to claim 1, wherein said biasing member is a disc spring.

7. A spinning reel comprising:
    said brake mechanism according to claim 1;
    a reel body;
    a drive unit disposed inside said reel body;
    a crank coupled to said drive unit, and mounted rotatably on an outer surface of said reel body;
    a rotor coupled to be driven by said drive unit when said crank is driven to rotate;
    a spool unit coupled to be driven by said drive unit to linearly reciprocate relative to said rotor in a direction of the central axis when said crank is driven to rotate, said spool unit including
    a spool shaft extending along the central axis,
    a spool member having an outer line-winding surface for a fishing line to be wound thereon, and an inner peripheral surface which is opposite to said outer line-winding surface to surround said spool shaft, and which has a front surface region and a rear surface region disposed rearwardly of said front surface region, said spool member being configured to be driven to rotate about the central axis in response to unwinding of the fishing line wound on said outer line-winding surface of said spool member, and
    a partition wall disposed between said front and rear surface regions, and extending radially and inwardly from said inner peripheral surface of said spool member to terminate at a center bore configured for passage of said spool shaft, said partition wall and said front surface region cooperatively defining an accommodation space for receiving said brake mechanism such that when said actuating member is moved to the inner position, said brake pieces are brought into frictional engagement with said front surface region of said spool member to thereby brake the rotation of said spool member.

8. The spinning reel according to claim 7, further comprising a brake plate disposed between said frame unit and said partition wall such that when said actuating member is moved to the inner position, said brake plate is brought into frictional engagement with said partition wall to thereby further brake the rotation of said spool member.

9. The spinning reel according to claim 7, further comprising a positioning ring member disposed in said accommodation space in front of said frame unit so as to position said frame unit in said accommodation space.

10. The spinning reel according to claim 7, wherein each of said actuating member and said biasing member has a center bore, said spool shaft being disposed in said central passage and extending through said central bores of said actuating member and said biasing member, said spool shaft having a front end segment which is disposed forwardly of said actuating member, and which has a male threaded region, said spinning reel further comprising an operating star member which has a rearward surface disposed to be in abutting engagement with said actuating member, and a female threaded region configured to be threadedly engaged with said male threaded region so as to permit said operating star member to slide relative to said spool shaft along the central axis to thereby allow said actuating member to be pushed inwardly by said rearward surface of said operating star member from the outer position to the inner position.

11. A baitcasting reel comprising:
said brake mechanism according to claim 1;
a reel body;
a spool unit mounted rotatably to said reel body; and
a drive unit including
  a crank mounted rotatably on an outer surface of said reel body,
  a main shaft extending along the central axis to terminate at an inner end segment which is disposed inside said reel body, and an outer end segment which is coupled to said crank so as to permit said main shaft to be driven by said crank to rotate about the central axis, and
  a drive gear member disposed inside said reel body, and including a base wall which is coupled to said inner end segment of said main shaft to permit said drive gear member to rotate with said main shaft, and a surrounding wall which extends from a periphery of said base wall in a direction of the central axis toward said outer end segment of said main shaft, said surrounding wall having an inner wall surface and an outer wall surface formed with driving teeth which is configured to be coupled to said spool unit to permit co-rotation of said spool unit and said drive gear member, said base wall and said inner wall surface of said surrounding wall cooperatively defining an accommodation space for receiving said brake mechanism such that when said actuating member is moved to the inner position, said brake pieces are brought into frictional engagement with said inner wall surface of said drive gear member to thereby brake the rotation of said drive gear member and to thereby brake rotation of said spool unit.

* * * * *